(12) United States Patent
Baghdasarian (10) Patent No.: US 10,435,182 B1
(45) Date of Patent: Oct. 8, 2019

(54) ARTICULATION TECHNIQUES FOR A SPACECRAFT SOLAR ARRAY

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 608 days.

(21) Appl. No.: 15/263,209

(22) Filed: Sep. 12, 2016

(51) Int. Cl.
*B64G 1/22* (2006.01)
*B64G 1/44* (2006.01)

(52) U.S. Cl.
CPC .............. *B64G 1/222* (2013.01); *B64G 1/443* (2013.01)

(58) Field of Classification Search
CPC ................................ B64G 1/222; B64G 1/443
See application file for complete search history.

(56) References Cited

U.S. PATENT DOCUMENTS

| | | | | |
|---|---|---|---|---|
| 3,525,483 A * | 8/1970 | Van Alstyne | ........... | B64G 1/222 136/245 |
| 3,733,758 A * | 5/1973 | Maier | ..................... | B64G 1/222 136/245 |
| 4,373,690 A * | 2/1983 | Stillman | ................ | B64G 1/222 136/245 |
| 4,703,907 A * | 11/1987 | Henry | ..................... | B64G 1/222 136/245 |
| 4,747,567 A | 5/1988 | Johnson et al. | | |
| 4,880,188 A * | 11/1989 | Roth | ..................... | B64G 1/222 244/172.6 |
| 5,509,747 A * | 4/1996 | Kiendl | .................... | B64G 1/222 136/245 |
| 5,673,459 A * | 10/1997 | Baghdasarian | .......... | B64G 1/22 16/235 |
| 5,697,582 A * | 12/1997 | Surauer | .................... | B64G 1/24 244/168 |
| 5,785,280 A * | 7/1998 | Baghdasarian | ........ | B64G 1/222 136/245 |
| 5,864,320 A * | 1/1999 | Baghdasarian | .......... | B64G 1/22 16/335 |

(Continued)

OTHER PUBLICATIONS

Wallrapp et al., "Simulation of Deployment of a Flexible Solar Array," *Multibody System Dynamics*; 7(1): 101-125 (Feb. 2002).

*Primary Examiner* — Richard R. Green
*Assistant Examiner* — Michael B. Kreiner
(74) *Attorney, Agent, or Firm* — Weaver Austin Villeneuve & Sampson LLP (57) ABSTRACT

Techniques for two-axis articulation of a deployed spacecraft solar array are disclosed. In one aspect, an arrangement mechanically coupling a solar array with a sidewall of a body of a spacecraft includes a proximal appendage, a distal appendage rotatably coupled with the proximal appendage by way of a hinge, and a closed cable loop (CCL) system coupled with the proximal appendage and the distal appendage. In an on-orbit configuration, a long axis of the proximal appendage defines an $\alpha$ axis that is substantially orthogonal to the sidewall. The hinge includes CCL disengagement mechanism configured to de-couple the CCL system from the proximal appendage and the distal appendage and a rotation driving mechanism configured to cause the distal appendage to rotate about a $\beta$ axis when the proximal appendage is in the on-orbit configuration, the $\beta$ axis being not aligned with the $\alpha$ axis.

20 Claims, 10 Drawing Sheets

(56) References Cited

U.S. PATENT DOCUMENTS

| | | | | |
|---|---|---|---|---|
| 6,008,447 | A * | 12/1999 | Meurer | B64G 1/222 136/245 |
| 6,010,096 | A * | 1/2000 | Baghdasarian | B64G 1/222 160/135 |
| 6,488,435 | B1 * | 12/2002 | Janson | B64G 1/222 136/245 |
| 7,275,285 | B1 | 10/2007 | Lorell et al. | |
| 8,021,069 | B2 * | 9/2011 | Baghdasarian | B64G 1/645 337/401 |
| 8,376,282 | B2 * | 2/2013 | Keller | B64G 1/222 136/245 |
| 8,496,209 | B2 * | 7/2013 | Chaix | B64G 1/222 244/172.6 |
| 8,568,053 | B2 * | 10/2013 | Baghdasarian | B64G 1/222 403/2 |
| 8,800,935 | B2 * | 8/2014 | Francis | B64G 1/66 244/172.6 |
| 8,894,017 | B1 * | 11/2014 | Baghdasarian | B64G 1/443 136/245 |
| 8,915,474 | B1 * | 12/2014 | Baghdasarian | B64G 1/44 244/172.6 |
| 9,120,583 | B1 * | 9/2015 | Spence | H02S 30/20 |
| 9,156,568 | B1 * | 10/2015 | Spence | B64G 1/222 |
| 9,546,510 | B2 * | 1/2017 | Baghdasarian | E05D 11/1014 |
| 9,764,857 | B2 * | 9/2017 | Baudasse | H01Q 1/1235 |
| 9,964,099 | B2 * | 5/2018 | Cassanelli | B64G 1/222 |
| 10,239,642 | B1 * | 3/2019 | Spence | B64G 1/443 |
| 2008/0078885 | A1 | 4/2008 | Canter et al. | |
| 2008/0143636 | A1 | 6/2008 | Couchman et al. | |

* cited by examiner

ARTICULATION TECHNIQUES FOR A SPACECRAFT SOLAR ARRAY

TECHNICAL FIELD

This invention relates generally to a spacecraft solar array, and more particularly to techniques for providing two-axis articulation of a deployed spacecraft solar array.

BACKGROUND OF THE INVENTION

The assignee of the present invention designs and manufactures spacecraft that include various structures that are deployable from a launch configuration to an on-orbit, or deployed configuration. For example, it is known to reconfigure a solar array from a launch configuration to an on-orbit configuration. In order to achieve compatibility with launch vehicle fairing constraints, the solar array, in the launch configuration, is generally disposed as compactly as possible adjacent to a sidewall of the spacecraft body. In the on-orbit configuration, the solar array is generally deployed to extend a very substantial distance (several times the width of the spacecraft body) along an axis (the "a axis") that is substantially orthogonal to the sidewall. During orbital operation, the solar array may be caused to rotate about the $\alpha$ axis so as to maximize collection of solar radiation by photovoltaic solar cells disposed on a surface of the solar array. A spacecraft solar array generally includes a closed cable loop (CCL) system which synchronizes deployment of various portions of the solar array. In the absence of the presently disclosed techniques, such a CCL system prevents independent articulation of solar arrays about an axis (the "$\beta$ axis") that may be transverse to, or at least non-aligned with, the $\alpha$ axis. As a result, a long axis of the solar array, once deployed in the on-orbit configuration, coincides with the $\alpha$ axis and the solar array is latched in that position for the entire mission.

SUMMARY OF INVENTION

The systems, methods and spacecraft disclosed herein have several innovative aspects, no single one of which is solely responsible for the desirable attributes disclosed herein.

One innovative aspect of the subject matter described in this disclosure can be implemented in a spacecraft comprising a body, a solar array, and an arrangement mechanically coupling the solar array with a sidewall of the body. The arrangement may include a proximal appendage having a proximal end connected with the body, the proximal appendage configured to be reconfigurable from a launch configuration to an on-orbit configuration, wherein, in the on-orbit configuration, a long axis of the proximal appendage defines an $\alpha$ axis that is substantially orthogonal to the sidewall. The arrangement may also include a distal appendage rotatably coupled with the proximal appendage by way of a hinge connecting a distal end of the proximal appendage with a proximal end of the distal appendage, the hinge being configured such that the distal appendage is rotatable with respect to the proximal appendage about a $\beta$ axis that is not aligned with the $\alpha$ axis. The arrangement may also include a closed cable loop (CCL) system coupled with the proximal appendage and the distal appendage and configured to synchronize deployment of at least a portion of the solar array. The hinge may include a rotation driving mechanism configured to cause the distal appendage to rotate about the $\beta$ axis when the proximal appendage is in the on-orbit configuration and a CCL disengagement mechanism configured to de-couple the CCL system from the proximal appendage and the distal appendage.

In some implementations, the arrangement may further include a restraint mechanism; wherein: the rotation driving mechanism is configured to cause the distal appendage to rotate about the $\beta$ axis in a first direction to a first orientation and the restraint mechanism is configured to cause the distal appendage to be fixed in the first orientation, and the rotation driving mechanism is configured to cause the distal appendage to rotate about the $\beta$ axis in a second direction from the first orientation to a second orientation and the restraint mechanism is configured to cause the distal appendage to be fixed in the second orientation.

In some implementations, the rotation driving mechanism may include a drive assembly coupled with the proximal appendage, the drive assembly including a motor having a central shaft connected with the proximal end of the distal appendage by way of a plurality of rods positioned radially outwardly from the central shaft. The restraint mechanism may include interlocking interfaces connected with each of the rods, each of the interlocking interfaces configured to interlock with a corresponding interlocking surface of the drive assembly. The interlocking interfaces may include a friction pad interface, a pin type interlock interface, and/or a mechanical interlock interface.

In some implementations, the spacecraft may further comprise a cam coupled with the distal appendage. The cam may have a plurality of slots, each slot corresponding to one of a plurality of positions; wherein: the restraint mechanism includes a latch roller connected with the proximal appendage, the latch roller configured to rest in the slots, and the rotation driving mechanism includes a motor connected with a fork configured to drive the latch roller from a first one of the slots to a second one of the slots. The slots may have a semi-obround cross-section and the latch roller may have a semi-circular cross-section.

In some implementations, the CCL disengagement mechanism may include a pulley connected with the distal appendage and the proximal appendage and a restraining member coupled with the distal end of the proximal appendage. The pulley may be configured to transmit torque from the CCL system to the proximal appendage and the distal appendage when the pulley is in a compressed position. The pulley may be configured to not transmit torque from the CCL system to the proximal appendage and the distal appendage when the pulley is in an expanded position. The restraining member may be configured to press a tab coupled with the pulley such that the pulley is in the compressed position when the restraining member presses the tab and the pulley is in the expanded position when the restraining member does not press the tab. The tab may be configured such that the restraining member presses the tab only during deployment of the distal appendage.

In some implementations, a controller may be configured to cause the distal appendage to rotate about the $\beta$ axis. The controller may be further configured to cause the distal appendage to rotate about the $\beta$ axis in a first direction to a first orientation. The controller may be further configured to cause the distal appendage to be fixed in the first orientation. The controller may be further configured to cause the distal appendage to rotate about the $\beta$ axis in a second direction from the first orientation to a second orientation. The controller may be further configured to cause the distal appendage to be fixed in the second orientation.

Another innovative aspect of the subject matter described in this disclosure can be implemented in a method comprising causing the arrangement mechanically coupling the solar array with the sidewall of the body of the spacecraft to transition from a launch configuration to an on-orbit configuration; decoupling, using the CCL disengagement mechanism, the CCL system from the proximal appendage and the distal appendage; and rotating, using the rotation driving mechanism, the distal appendage about the β axis.

In some implementations the method may further comprise: rotating, using the rotation driving mechanism, the distal appendage about the β axis in a first direction to a first orientation; fixing the distal appendage in the first orientation; rotating, using the rotation driving mechanism, the distal appendage about the β axis in a second direction from the first orientation to a second orientation; and fixing the distal appendage in the second orientation.

BRIEF DESCRIPTION OF THE DRAWINGS

Features of the invention are more fully disclosed in the following detailed description of the preferred embodiments, reference being had to the accompanying drawings, in which:

FIG. 1 D illustrates a cross-sectional view of an example of a spacecraft with a closed cable loop (CCL) system, in accordance with some implementations.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "I" is also used as a shorthand notation for "and/or".

The terms "spacecraft", "satellite" and "vehicle" may be used interchangeably herein, and generally refer to any orbiting satellite or spacecraft system.

The terms "rotate" and "tilt" may be used interchangeably herein, and generally refer to a change in angular orientation of an abject about an axis.

The phrase "substantially orthogonal" as used herein, unless otherwise expressly indicated, refers to a relationship in which a plane or generally flat part or surface is either orthogonal to, or at a minimum angle close to 90° with respect to, a reference axis. A plane which is substantially orthogonal to an axis may be, for example, at as much as approximately an 80° minimum angle with respect to the axis and still be considered to be substantially orthogonal. The terms "orthogonal" and "substantially orthogonal" may be used interchangeably herein.

Embodiments disclosed hereinbelow include significant improvements to a spacecraft solar array. In the absence of the presently disclosed techniques, solar arrays of conventional spacecraft may be unable to independently rotate about the β axis after deployment. By way of example, a solar array of a conventional spacecraft may be linked to a closed cable loop (CCL) system which synchronizes deployment of the structures, such as solar arrays, of the spacecraft. Linkage to such a CCL system prevents independent β axis tilting of solar arrays of such conventional spacecraft. Some foreseen space missions would benefit from an ability to rotate or "tilt", after deployment, at least a portion of the solar array about an axis (the "β axis") that may be transverse to, or at least non-aligned with, the α axis. By way of illustration, in preparation for the spacecraft landing on an asteroid, or docking with a second spacecraft it may be desirable to tilt the solar arrays of the spacecraft upward with respect to the surface of the asteroid or second spacecraft such that the solar arrays are less likely to be damaged by contact with a portion of the asteroid or a portion of the second spacecraft.

The presently disclosed techniques, on the other hand, allow for synchronized deployment of solar arrays using a CCL system while at the same time providing a mechanism for disengaging the CCL system such that the solar arrays may be tilted after deployment.

The approach disclosed herein provides for several mechanisms allowing for a structure of a spacecraft, such as a solar array, to be independently re-oriented after deployment, e.g. in flight, prior to landing on the surface of a planet or asteroid, prior to docking with a space station, etc. In the absence of the present teachings, solar arrays of conventional spacecraft suffer an inability to independently tilt upward with respect to the surface of obstacles, resulting in potential damage caused by contact with the obstacle, e.g. a portion of an asteroid or a second spacecraft. The mechanisms disclosed herein may be used under a variety of circumstances, e.g. while a spacecraft is in orbit or prior to the spacecraft landing on various surfaces in a variety of gravitational environments such as that of an asteroid or planet.

Figure 1A:
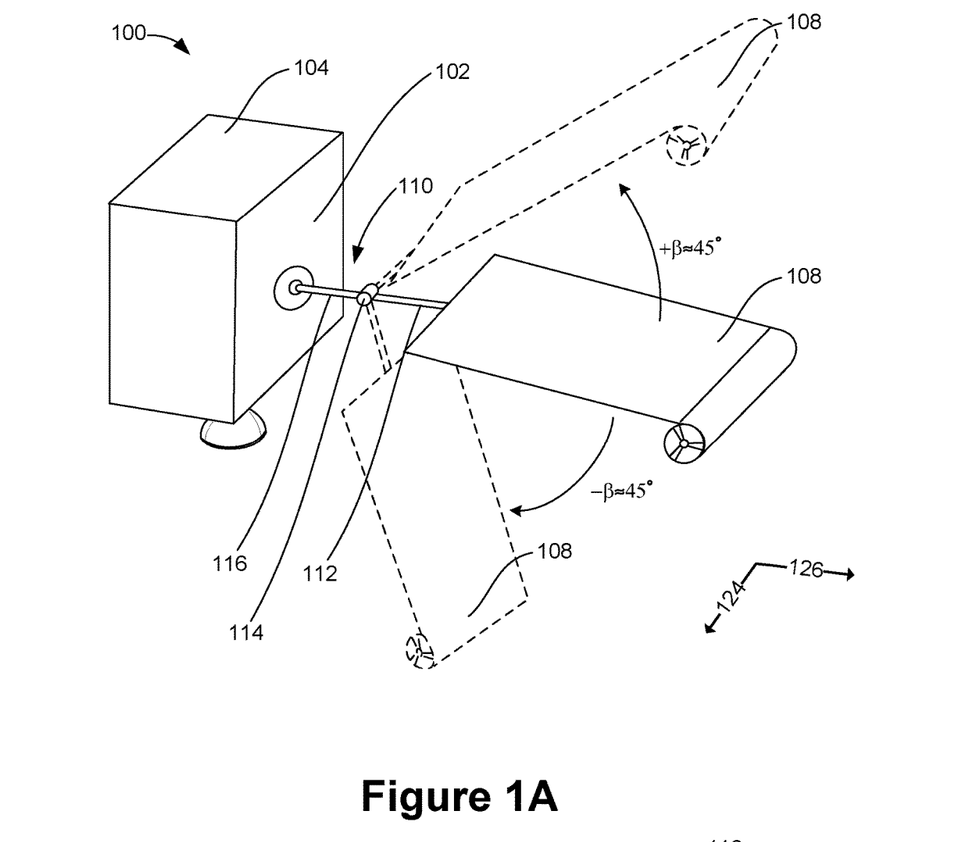
FIG. 1A illustrates an isometric view of an example of a spacecraft, in accordance with some implementations.

FIG. 1A shows an isometric view of an example of a spacecraft 100, in accordance with some implementations. As shown in FIG. 1A, the spacecraft 100 includes a body 104, a solar array 108 and an arrangement 110 mechanically coupling the solar array 108 with a sidewall 102 of the body 104. The arrangement 110 includes a proximal appendage 116 having a proximal end coupled with the body 104. A long axis of the proximal appendage 116 defines an α axis 126 that is substantially orthogonal to the sidewall 102 when the proximal appendage 116 is in the on-orbit configuration depicted in FIG. 1A (other configurations of the spacecraft 100 are discussed in further detail below in the context of FIGS. 1B and 1C.)

The arrangement 110 also includes a hinge 114, a distal appendage 112 and a CCL (not illustrated in FIG. 1A). The hinge 114 is coupled with a distal end of proximal appendage 116 and with a proximal end of distal appendage 112. Thus, the hinge 114 rotatably couples the distal appendage 112 with the proximal appendage 116. As described further below, the hinge 114 may be configured such that the distal appendage 112 is rotatable with respect to the proximal appendage 116 about a β axis 124 that is not aligned with the α axis 126. The β axis 124 may be, but is not necessarily, orthogonal to the α axis 126.

The hinge 114 may include a rotation driving mechanism, discussed below in the context of FIGS. 3A-4C. The rotation driving mechanism may be configured to cause the distal appendage 112 to rotate about the β axis 124 when the proximal appendage 116 is in the on-orbit configuration. For example, the rotation driving mechanism may be configured to cause the distal appendage 112 to rotate (articulate) about the β axis 124 in a first direction (e.g. clockwise) to a first orientation (e.g. β=25 degrees.) A restraint mechanism, discussed below, may be configured to cause the distal appendage 112 to be fixed in the first orientation. The rotation driving mechanism may then be configured to cause the distal appendage 112 to rotate about the β axis 124 in a second direction (e.g. counterclockwise) from the first orientation to a second orientation (e.g. β=13 degrees.) The restraint mechanism may be configured to cause the distal appendage 112 to be fixed in the second orientation. By way of illustration, FIG. 1A depicts the distal appendage 112 at 3 different positions (β=45 degrees, β=0 degrees, and β=−45 degrees). While FIG. 1A shows 3 possible angular positions of the distal appendage 112, it should be understood that the mechanisms disclosed herein allow the distal appendage 112 to be rotated to and fixed in various angular positions at (or after) deployment.

In some implementations, as discussed above, the arrangement 110 may include a closed cable loop (CCL) system (not illustrated) coupled with the proximal appendage 116 and the distal appendage 112. The CCL system may be coupled with the proximal appendage 116 and the distal appendage 112 and may be configured to synchronize deployment of at least a portion of the solar array 108.

As discussed above, it may be desirable to de-couple the proximal appendage 116 and the distal appendage 112 from the CCL system so that the distal appendage 112 may be rotated about the β axis 124 without affecting the CCL system or any other structures coupled with the CCL system. As such, the hinge 114 may include CCL disengagement mechanism (not depicted in FIG. 1A) configured to de-couple the CCL system from the proximal appendage 116 and from the distal appendage 112. The CCL disengagement mechanism may vary across implementations and is discussed below in the context of FIGS. 2A-2D.

Figure 1B:
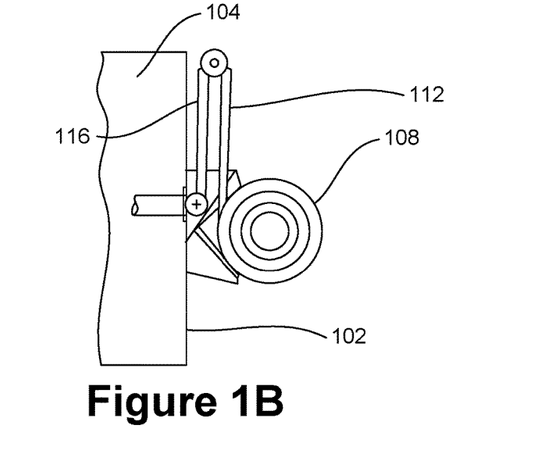
FIG. 1B illustrates a cross-sectional view of an example of a spacecraft, in accordance with some implementations.
Figure 1C:
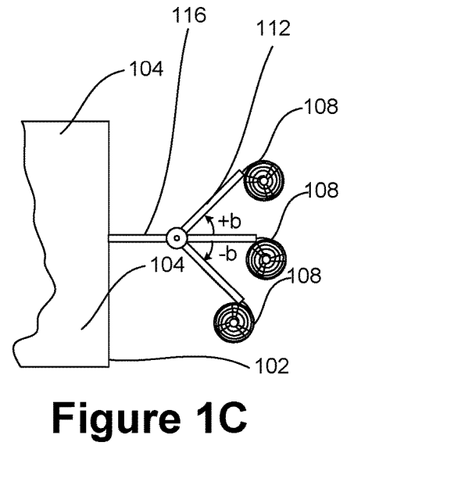
FIG. 1C illustrates a cross-sectional view of an example of a spacecraft, in accordance with some implementations.

As discussed above, the solar array 108, the proximal appendage 116, and the distal appendage 112 of spacecraft 100 may be reconfigurable from a launch configuration to an on-orbit configuration. For example, FIG. 1B illustrates a cross-sectional view of the spacecraft 100 with the proximal appendage 116 and the distal appendage 112 in a launch configuration. In FIG. 1B, in order to achieve compatibility with launch vehicle fairing constraints, the solar array 108, in the launch configuration, is disposed as compactly as possible adjacent to the sidewall 102 the body 104. By contrast, FIG. 1C illustrates a cross-sectional view of the spacecraft 100 with the proximal appendage 116 and distal appendage 112 in an on-orbit configuration. In FIGS. 1A and 1C, in the on-orbit configuration, the solar array 108 is positioned to extend a substantial distance along the α axis that is substantially orthogonal to the sidewall 102.

The techniques disclosed herein may be practiced to provide post-deployment β axis rotation of a variety of structures. For example, the solar array 108 of FIGS. 1A-1C, which is a Roll Out Solar Array (ROSA), may be rotated about the β axis 124 in the "deployed" or "rolled out" configuration depicted in FIG. 1A. On the other hand, in FIGS. 1B and 1C, the solar array 108 is in a "rolled up" configuration such that the solar array 108 may be disposed as compactly as possible.

While the solar array 108 of FIGS. 1A-1C is a ROSA, the spacecraft disclosed herein are configurable to be used in conjunction with a variety of structures. By way of example, while the spacecraft 100 of FIGS. 1A-1C includes a ROSA, other structures, such as a solar array including a number of rigid panels, may instead be connected with the distal appendage 112.

As described above, appendages and structures of spacecraft, e.g. spacecraft 100 of FIGS. 1A-1C, may be deployed synchronously. To achieve such synchronous deployment, appendages and structures are often mechanically linked, e.g. by using a Closed Cable Loop (CCL) system. When such appendages are mechanically linked, it becomes impossible to move one appendage without moving other linked appendages and or structures unless the mechanical link is broken. As such, in order to achieve a re-orientation of a single solar array of a spacecraft without re-orienting other structures of the spacecraft, a mechanism to break such a mechanical link may be desirable.

Figure 1D:
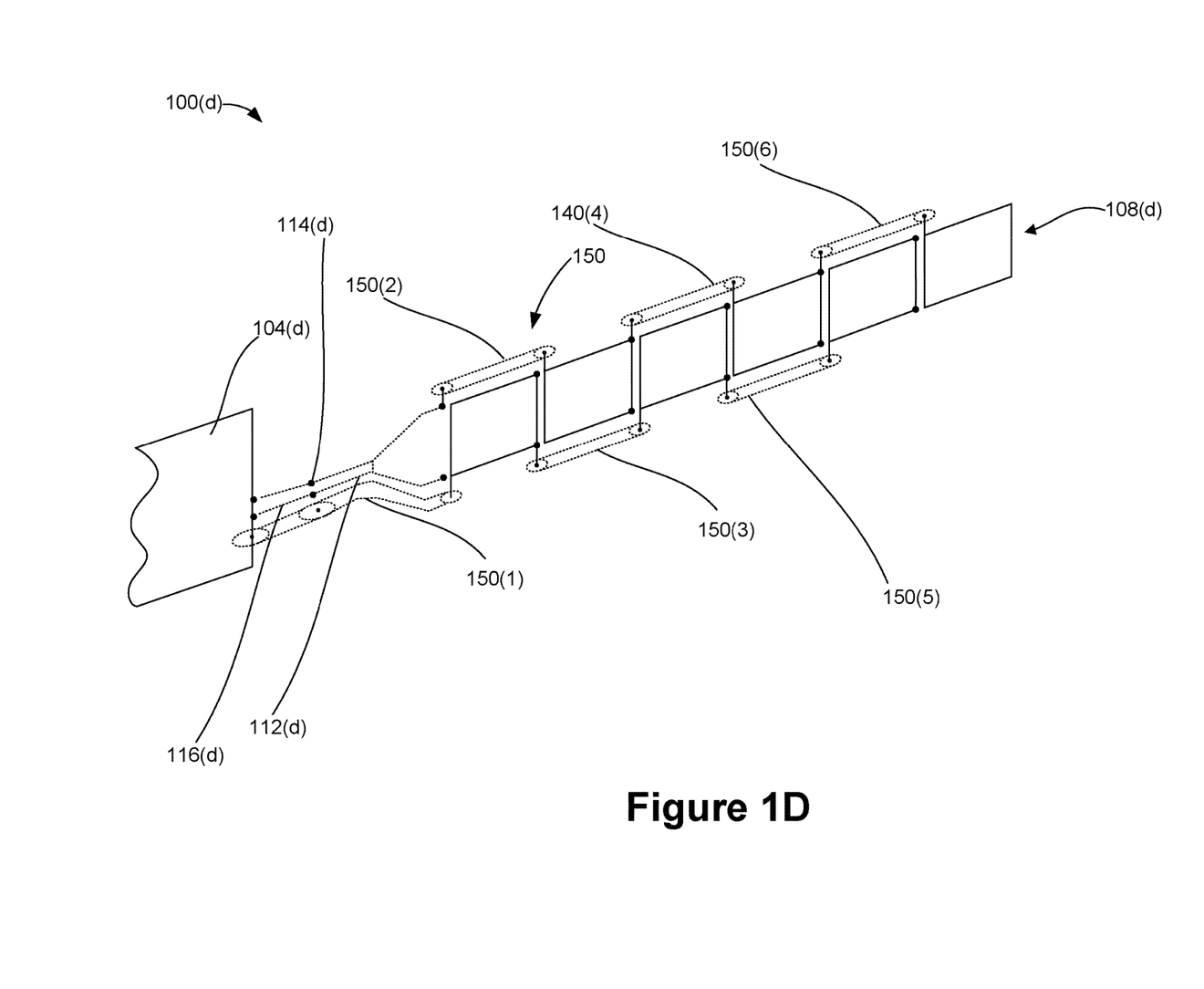

FIG. 1D shows an example of a spacecraft 100(d) with a CCL system 150, which includes CCLs 150(1)-150(5). Like the spacecraft 100 of FIGS. 1A-1C, a hinge 114(d) rotatably couples distal appendage 112(d) with proximal appendage 116(d). The distal appendage 112(d) is coupled with solar array 108(d). Each of the CCLs 150(1)-150(5) is coupled with an adjacent CCL. By way of example, a motor may drive CCL 150(1), which is coupled with CCL 150(2) such that rotation of CCL 150(1) transmits torque to CCL 150(2), causing rotation of CCL 150 (2). When the CCL system 150 is engaged, each of the CCLs 150(1)-150(5) may transmit torque to a component of the spacecraft 100(*d*). By way of example, as described further below in the context of FIGS. 2A and 2B, when the CCL system 150 is engaged, CCL 150(1) transmits torque to the distal appendage 112(*d*). While the CCLs of CCL 150 are coupled with panels of a solar array, a CCL system may be coupled with any set of members of a spacecraft to synchronize deployment of the set of members.

FIGS. 2A-2D show examples of a hinge with a CCL disengagement mechanism for breaking the mechanical link described in the preceding paragraph. In FIGS. 2A-2D, a pulley 204, which is connected with the CCL system 205 (depicted in FIGS. 2C and 2D), is also connected with the proximal appendage 116 and the distal appendage 112 of spacecraft 100 of FIGS. 1A-1C via a shaft 206. It should be noted that shaft 206 is rigidly connected to distal appendage 112 while free to rotate through proximal appendage 116.

Figure 2A:
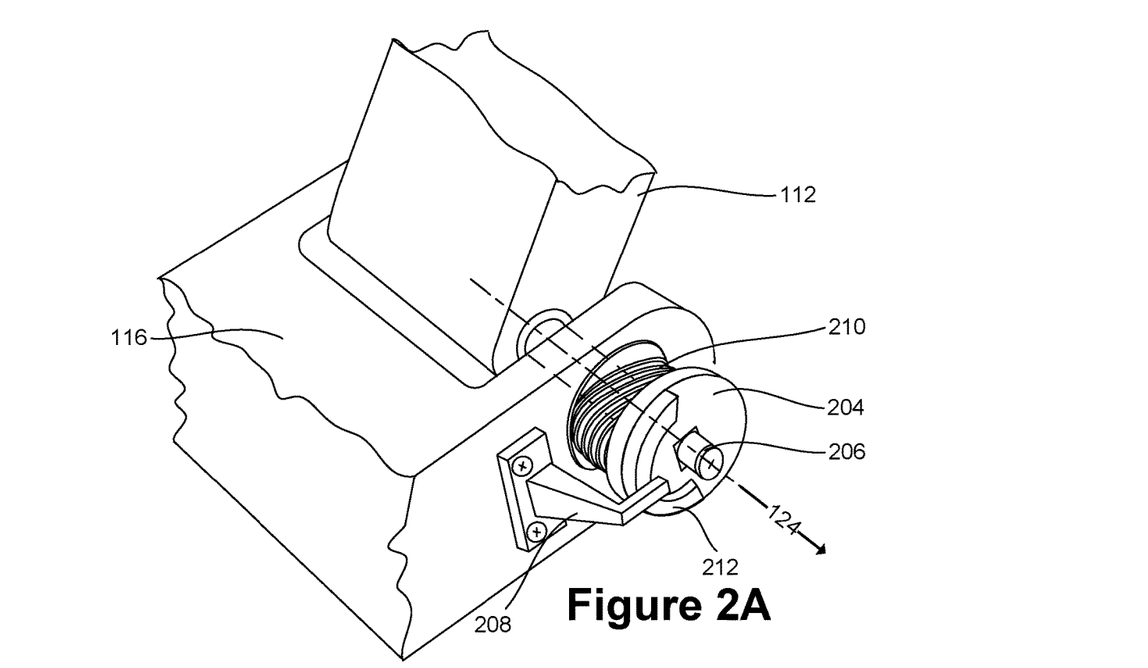
FIGS. 2A and 2B illustrate isometric views of an example of a hinge with a closed cable loop (CCL) disengagement mechanism, in accordance with some implementations.
Figure 2B:
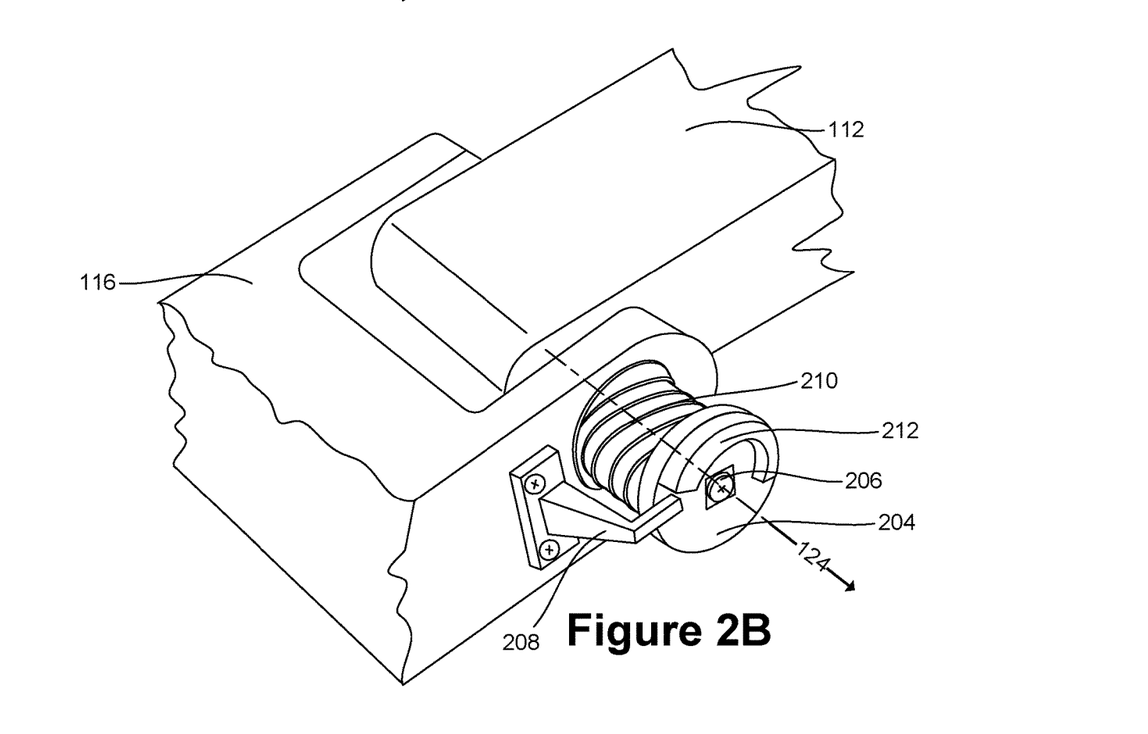
Figure 2C:
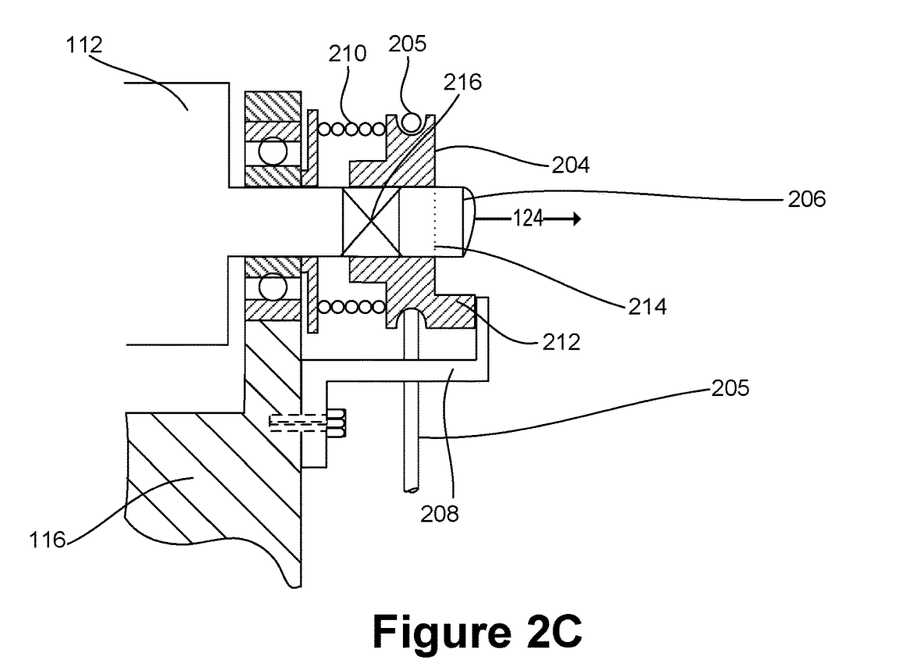
FIGS. 2C and 2D illustrate cross-sectional views of an example of a hinge with a CCL disengagement mechanism, in accordance with some implementations.

When the proximal appendage 116 and the distal appendage 112 are in the launch configuration, the pulley 204 is in a compressed position depicted in FIGS. 2A and 2C. When in the compressed position of FIGS. 2A and 2C, the CCL system 205 is engaged because the pulley 204 transmits torque from the CCL system 205 to the proximal appendage 116 and the distal appendage 112. By way of illustration, in FIGS. 2A and 2C, a restraining member 208 mounted on the distal end of the proximal appendage 116 presses a tab 212 mounted on the pulley such that a spring 210 is compressed and the pulley 204 is in a compressed position. When the pulley 204 is in the compressed position, a square opening 214 (illustrated in FIG. 2C) of the pulley 204 sits on a square portion 216 (illustrated in FIG. 2C) of the shaft 206 such that the pulley 204 cannot rotate freely, but rather transmits torque from the CCL system 205 to the proximal appendage 116 and the distal appendage 112 via the square portion 216 of the shaft 206.

As the proximal appendage 116 and the distal appendage 112 transition from the launch configuration to the on-orbit configuration, the pulley 204 rotates about the β axis with the distal appendage 112. As the pulley 204 rotates about the β axis, the tab 212 rotates with respect to the restraining member 208. The tab 212 may be sized and positioned such that when the on-orbit configuration is reached, the restraining member 208 no longer presses the tab 212. Therefore, once the proximal appendage 116 and the distal appendage 112 reach the on-orbit configuration, the pulley 204 transitions from the compressed position depicted in FIGS. 2A and 2C to an expanded position depicted in FIGS. 2B and 2D.

Figure 2D:
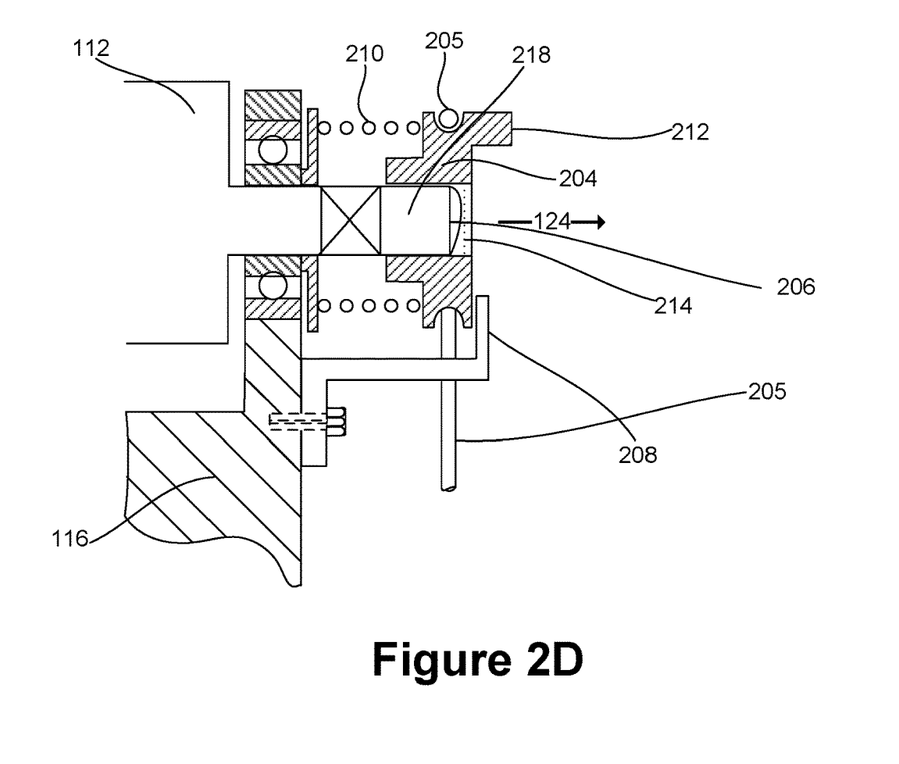

When the pulley 204 is in an expanded position depicted in FIGS. 2B and 2D the CCL system 205 becomes disengaged because the pulley 204 no longer transmits torque from the CCL system 205 to the proximal appendage 116 and the distal appendage 112. By way of illustration, when the restraining member 208 no longer presses the tab 212, the spring 210 pushes the pulley 204 outward along the shaft 206 to the expanded position. Once in the expanded position, the pulley 204 may be positioned such that square opening 214 (illustrated in FIG. 2D) of the pulley 204 sits on a round portion 218 (illustrated in FIG. 2D) of the shaft 206 such that the pulley 204 can rotate freely without transmitting torque from the CCL system 205 the proximal appendage 116 and the distal appendage 112. As such, when the pulley 204 is in the expanded position, the CCL system 205 is disengaged from the proximal appendage 116 and the distal appendage 112, e.g. this decouples the CCL from the proximal appendage 116 and the distal appendage 112 such that the CCL merely causes the pulley to rotate freely rather than transmitting torque to the proximal appendage 116 and the distal appendage 112.

Figure 3A:
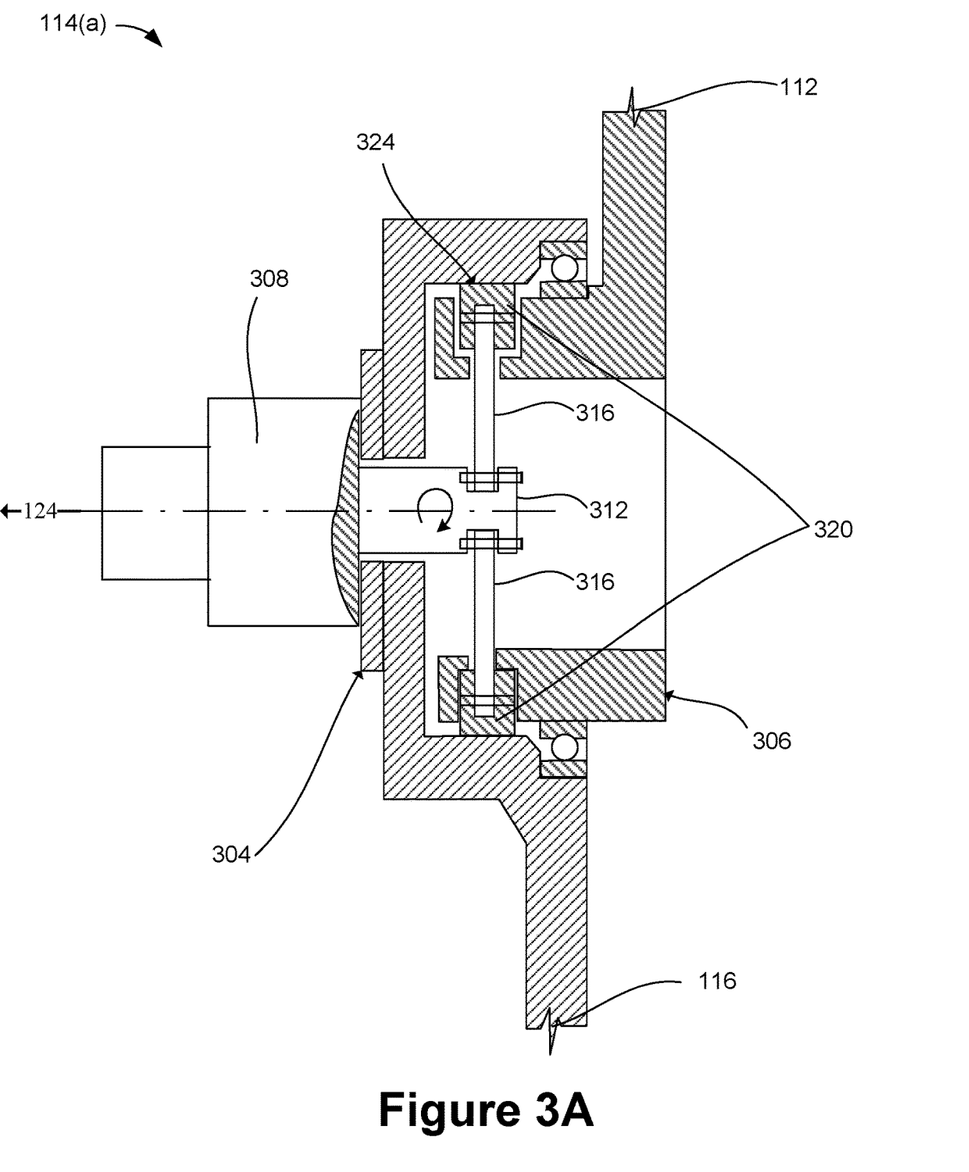
FIG. 3A illustrates a cross-sectional view of an example of a hinge, in accordance with some implementations.
Figure 3B:
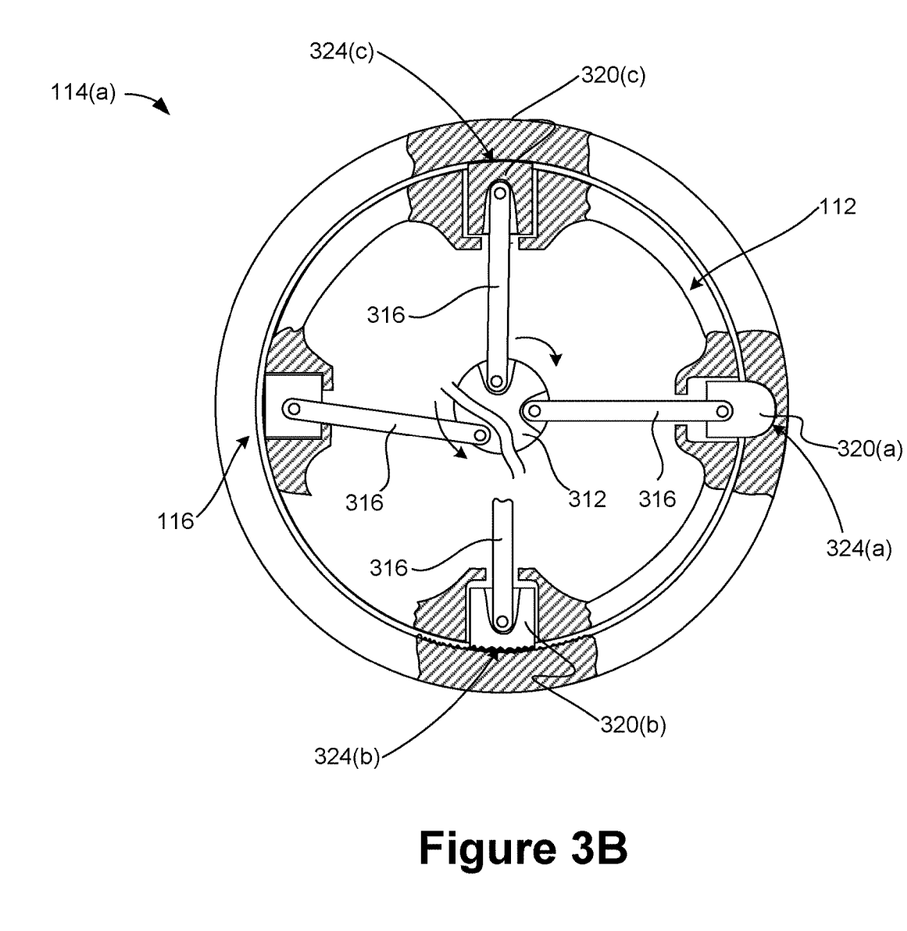
FIG. 3B illustrates a cross-sectional view of an example of a hinge, in accordance with some implementations.

As discussed above, the hinge 114 of FIGS. 1A-1C may include a variety of rotation driving and restraint mechanisms that are configured to cause the distal appendage 112 to rotate about the β axis 124 and become fixed in particular positions. FIGS. 3A and 3B show views from two different cross-sections of a hinge 114(*a*) that includes one such example of a rotation driving and restraint mechanism. The hinge 114(*a*) is a particular embodiment of the hinge 114 of FIGS. 1A-1C.

In FIG. 3A, a rotation driving mechanism includes a drive assembly 304 that may be mounted on the distal end of the proximal appendage 116 of the spacecraft 100 of FIGS. 1A-1C. The drive assembly 304 may include a high torque motor 308 having a central shaft 312. The motor 308 may drive a lockable linkage assembly 306, which may be mounted on the proximal end of the distal appendage 112. The central shaft 312 of FIG. 3A may be connected with the proximal end of the distal appendage 112 by way of a plurality of rods 316 positioned radially outwardly from the central shaft 312.

Rotation of the motor 308 allows the distal appendage 112 to be rotated about the β axis 124 and fixed in a desired position. By way of illustration, when the distal appendage 112 is in a fixed position, interlocking interfaces 320 of rods 316 may be interlocked with a corresponding interlocking surface 324 on the inside of the drive assembly 304, as described in further detail below in the context of FIG. 3B. The central shaft 312 may include an offset crank so that when the distal appendage 112 is fixed at a particular position, driving the motor 308 in either direction causes the rods 316 to retract, unlocking the interlocking interfaces 320 from the interlocking surface 324 and freeing the distal appendage 112 to be rotated by the motor 308. Once the distal appendage 112 reaches a desired angular position, rotation of the motor 308 may be reversed, pushing the rods 316 outwards. As the rods 316 move outwards, the interlocking interface 320 of each rod 316 is caused to come into contact with the interlocking surface 324, locking the distal appendage 112 at the desired position.

Referring now to FIG. 3B, which illustrates another cross-sectional view the hinge 114(*a*). FIG. 3B depicts three types interlocking mechanisms, e.g. combinations of interlocking interfaces 320 and interlocking surfaces 324 described in the preceding paragraph: 1) a pin type interlock including a rounded interlocking interface 320(*a*), which is configured to interlock with a round recessed interlocking surface 324(*a*); 2) a mechanical interlock including a ridged interlocking interface 320(*b*), which is configured to interlock with a ridged interlocking surface 324(*b*); and 3) a friction interlock including a friction pad interlocking interface 320(*c*), which is configured to interlock with a frictional interlocking surface 324(*c*). It will be appreciated that while three different interlocking mechanisms are depicted in FIG. 3B, these mechanisms are depicted together for explanatory purposes. In practice, a single interlocking mechanism may be used.

Interlocking mechanisms may have various advantages and/or disadvantages depending on the situation in which each mechanism is used. For example, because use of a friction pad allows for a rod to be locked at any position on the interlocking surface, friction pads may be used to achieve a high level of angular granularity. On the other hand, a friction pad may have limited load-bearing capability. In other words, if friction pads are used as interlocking interfaces for a distal appendage that bears a massive load and/or a load that is subject to a high acceleration, a large amount of force (e.g. a very high friction coefficient and/or normal force between the interlocking surface and the friction pad interface) will be required to lock the distal appendage 112 in place. As such, if a friction pad is used, slippage may occur if the load borne by the distal appendage 112 is high or if the distal appendage 112 faces a high acceleration. By contrast to friction pads, using a pin type interlock requires a recessed hole, limiting the angular granularity of positions at which the distal appendage may be locked, as only a limited number of recessed holes may be placed around the interlocking surface. However, since a pin type interlock is physically locked in place (rather than relying on friction) the pin type interlock may be used for a greater load-bearing capability than a friction pad. A mechanical interlock may be middle ground between a pin type interlock and a friction pad, e.g. the mechanical interlock has a greater load-bearing capability and provides for less angular granularity than the friction pad; on the other hand, the mechanical interlock has a lesser load-bearing capability and provides for more angular granularity than the pin type interlock. Alternatively, non-depicted interlocking interfaces and surfaces may be used. By way of illustration, a magnetic interlocking interface and may interlock with a magnetic surface.

Based on the discussion in the preceding paragraph, it will be appreciated that in any given situation, a desired granular angularity may be weighed against a desired load-bearing capability in determining the appropriate type of interlocking mechanism to be used. By way of example, if the spacecraft 100 of FIGS. 1A-1C will face high accelerations and the structure(s) borne by the distal appendage 112 is heavy, then an interlocking mechanism that is able to bear a substantial load at the expense of angular granularity may be desirable in order to avoid slippage. On the other hand, if slippage is acceptable, if a spacecraft does not face large acceleration, and/or if a load is relatively light, an interlocking mechanism that achieves high angular granularity at the expense of loadbearing capability may be used.

In some implementations, the rotation driving and restraint mechanisms described in the preceding paragraphs may include additional features that are not depicted in FIGS. 3A and 3B. For example, the rotation driving and/or interlocking mechanism may include an angular transducer in order to register the angular position of the distal appendage 112.

Figure 4A:
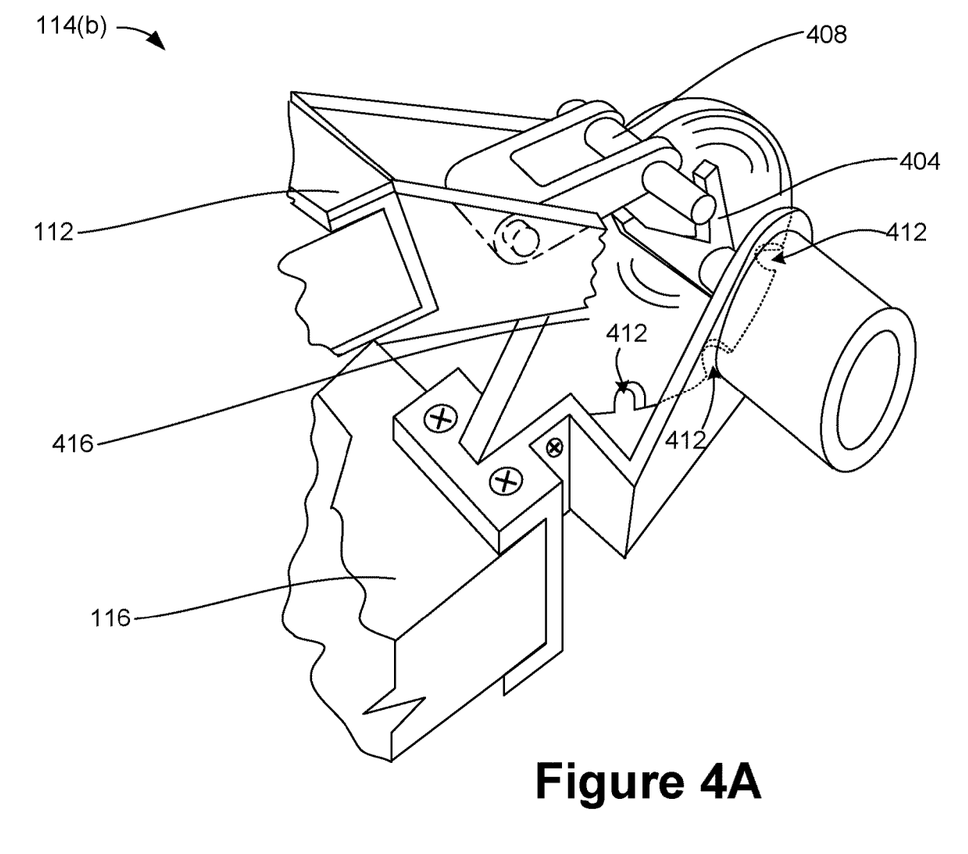
FIG. 4A illustrates an isometric view of an example of a hinge, in accordance with some implementations.
Figure 4B:
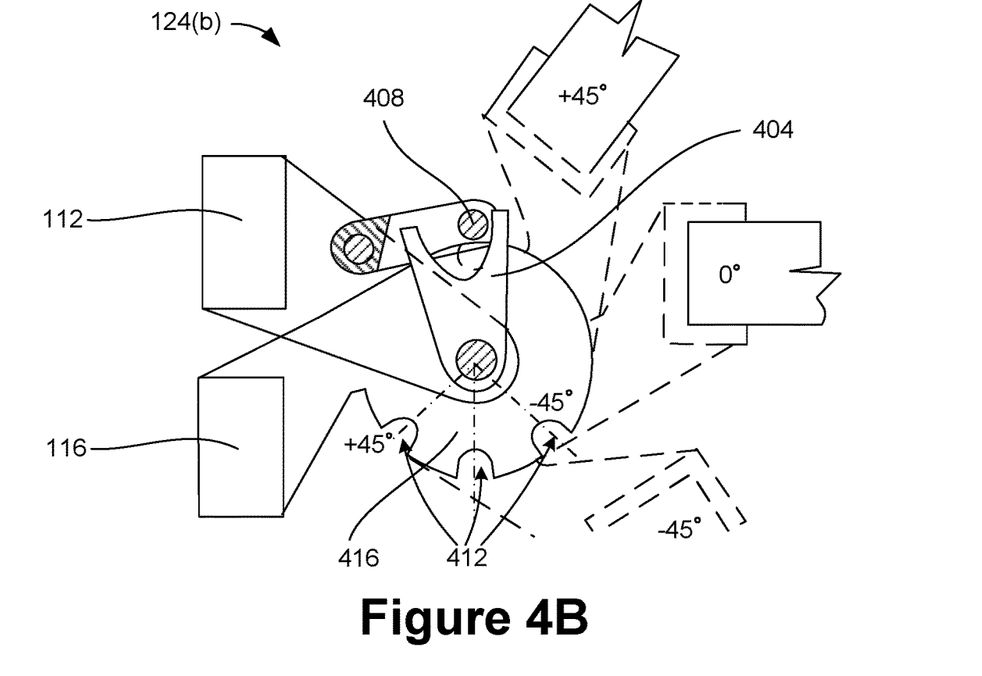
FIG. 4B illustrates a cross-sectional view of an example of a hinge, in accordance with some implementations.

As discussed above, a variety of rotation driving and restraint mechanisms may be configured to cause an appendage, such as the distal appendage 112 of FIGS. 1A-1C, to be rotated about the β axis 124 and become fixed in particular positions. FIGS. 4A and 4B show views of a hinge 114(b) that includes an alternative example of a rotation driving and restraint mechanism to those discussed above in the context of FIGS. 3A and 3B.

In FIGS. 4A and 4B, a motor driven V-shaped fork 404 mounted on the distal end of the proximal appendage 116 of the spacecraft 100 of FIGS. 1A-1C may control the motion of a latch roller 408 mounted on the proximal end of the distal appendage 112. When the distal appendage 112 is fixed in a particular position, the latch roller 408 may rest in any one of slots 412 on the surface of a cam 416 mounted on the distal end of the proximal appendage 116. The latch roller 408 may be spring loaded causing the latch roller 408 to stay on the surface of the cam 416.

In some implementations, such slots 412(a)-(c) may be placed in locations on the surface of the cam 416 corresponding to pre-determined angles at which it is desired for the distal appendage 112 to be fixable (e.g. β=45 degrees, β=0 degrees, and β=−45 degrees, as shown in FIG. 1A.)

The fork 404, latch roller 408, slots 412, and cam 416 may function as rotation driving and restraint mechanisms configured to cause the distal appendage 112 to be rotated about the β axis 124 and become fixed in particular positions. By way of illustration, rotating the fork 404, using a motor (not shown), pushes the latch roller 408 out of the slot 412 in which the latch roller 408 rests. The latch roller 408 may then travel along the surface of the cam 416 until the latch roller 408 is dropped into a particular slot 412 in surface of the cam 416 at which point the spring (not pictured) and the fork 404 act as a restraint mechanism keeping the latch roller in the particular slot 412 and fixing the distal appendage 112 at the angular position corresponding to the particular slot 412.

Figure 4C:
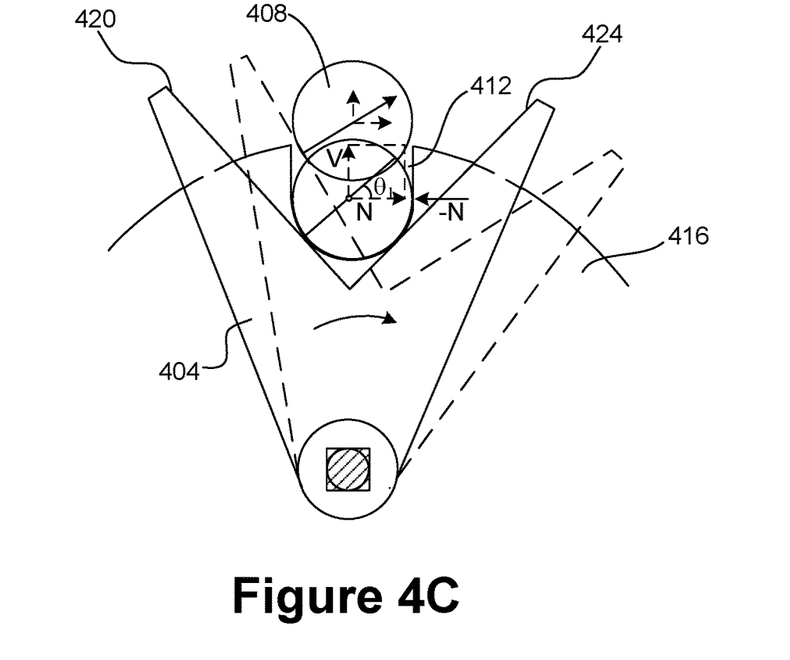
FIG. 4C illustrates a detailed cross-sectional view of an example of a latch fork and a latch roller, in accordance with some implementations.

The dynamics of the fork 404 and the latch roller 408 may be better understood through an example. By way of illustration, FIG. 4C shows a detailed cross-sectional view of the fork 404 and the latch roller 408. As the fork 404 rotates clockwise, a first leg 420 of the fork 404 applies a force to the latch roller 408 at an angle $\theta_1$, causing the latch roller 408 to lift out of the slot 412 onto surface of the cam 416 where the latch roller 408 may travel. The motion of the latch roller 408 may be restrained by a second leg 424 of the fork 404 until the latch roller 408 is dropped into the next slot (not shown in FIG. 4C). It should be noted that the fork 404 may rotate in either direction (clockwise or counter clockwise) about the β axis such that the latch roller 408 may travel between slots 412 in either direction along the surface of the cam 416.

The shape of slots and latch rollers used in the rotation driving and restraint mechanisms discussed herein may vary across implementations. By way of illustration, in FIGS. 4A-4C slots 412(a)-(c) are depicted as having a semi-obround cross-section and the latch roller 408 is depicted as having semi-circular cross-section. Alternatively, a latch roller may have any shape capable of rolling along the surface of a cam, e.g. such a latch roller may be polygonal. Slots of such a cam may have any shape that would fit a given latch roller. By way of illustration, a latch roller with a decagonal cross-section may be used with a cam that has slots with a semi-decagonal cross-section.

Figure 5:
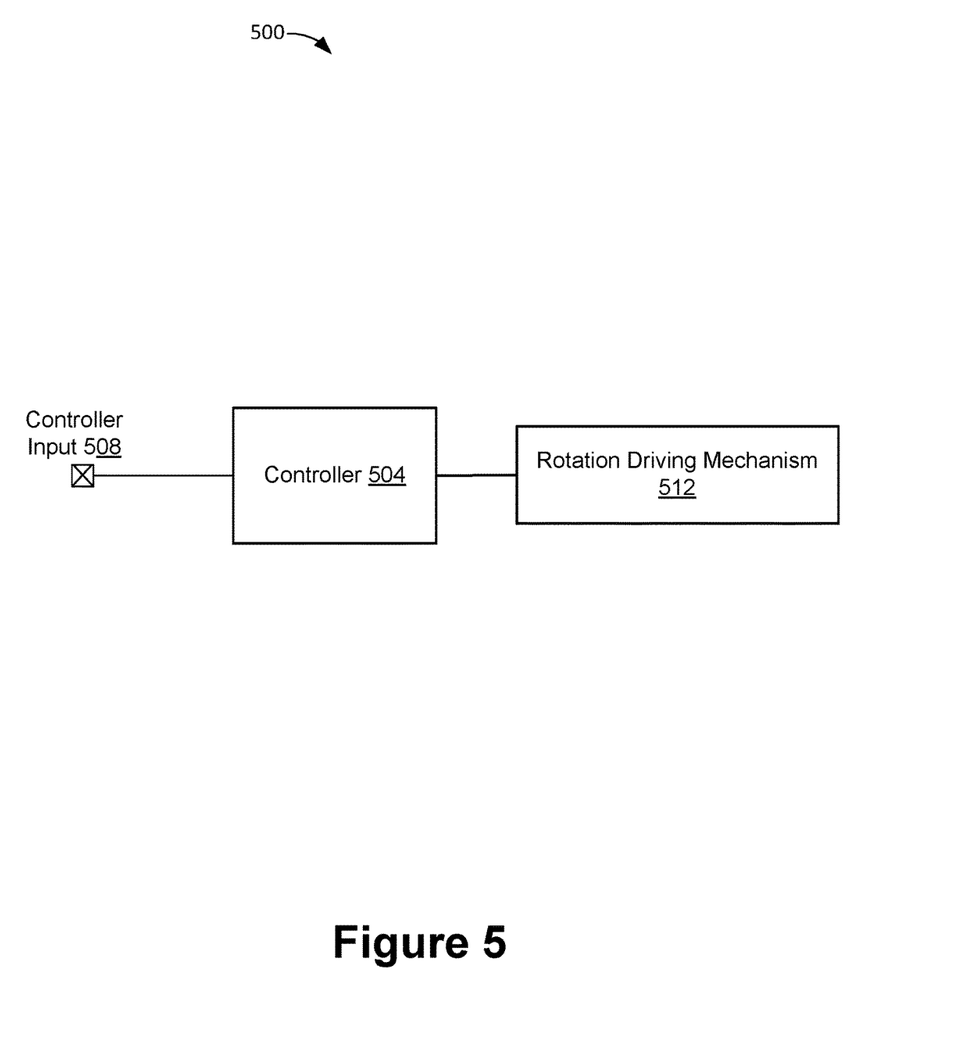
FIG. 5 illustrates an example of a system block diagram of a controller adjusting an orientation of an appendage of a spacecraft, in accordance with some implementations.

FIG. 5 shows an example of a system block diagram of a controller 504 which may be configured to adjust the position of an appendage of a spacecraft, e.g. distal appendage 112 of FIGS. 1A-C.

As an example, controller 504 can receive data on controller input 508 indicating that the distal appendage 112 of FIGS. 1A-1C should be rotated about the β axis 124 to a particular angular position. Controller 504 of FIG. 5 can maintain a record of the current orientation of the distal appendage 112 of FIGS. 1A-1C. Rotation driving mechanism 516 of FIG. 5 may be any of the rotation driving mechanisms discussed above. By way of illustration, the controller 504 may send a signal to the motor 208 of FIG. 2A indicating that the distal appendage 112 of FIGS. 1A-C should be rotated about the β axis 124 to a particular angular position. The signal may cause the motor 208 to rotate the distal appendage 112 to the particular angular position. When it is determined, e.g. using an angular transducer, that the distal appendage 112 has reached the particular angular position, the controller 504 may send a signal to the motor 208 of causing the motor 308 to cease rotation. At this point, as described above, interlocking interfaces 320 of FIG. 3B may become interlocked with interlocking surface 323, causing the distal appendage 112 to become fixed at the particular angular position.

Figure 6:
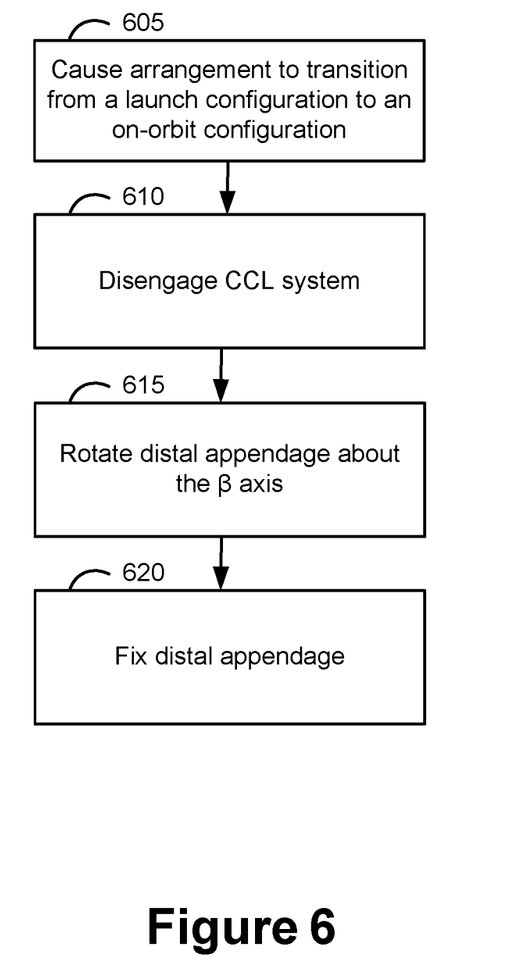
FIG. 6 illustrates an example of a flowchart of a method for adjusting an orientation of an appendage of a spacecraft, in accordance with some implementations.

FIG. 6 illustrates an example of a flowchart of a method for adjusting an orientation of an appendage of a spacecraft, in accordance with some implementations. At block 605, an arrangement, e.g. arrangement 110 of FIG. 1A, is caused to transition from a launch configuration to an on-orbit configuration. For example, solar array 108 and the proximal appendage 116 and the distal appendage 112 of spacecraft 100 may be transitioned between the launch configuration of FIG. 1B to the on-orbit configuration of FIG. 1A.

At block 610, a CCL system is disengaged. By way of example, when on-orbit configuration is reached pulley 404 reaches the expanded position depicted in FIGS. 2B and 2D, causing the CCL system to become disengaged from the proximal appendage 116 and the distal appendage 112, as described above.

At block 615, a distal appendage, e.g. distal appendage 112 of FIGS. 1A-C, is rotated about the β axis. By way of example, controller 504 of FIG. 5 may send a signal rotation driving mechanism 512 causing the distal appendage 112 of FIGS. 1A-C to be rotated in either direction to a particular angular position with respect to the β axis.

At block 620, a distal appendage, e.g. distal appendage 112 of FIGS. 1A-C, is fixed at the particular angular position with respect to the β axis. By way of example, any of the restraint mechanisms described above may cause distal appendage 112 of FIGS. 1A-C to become fixed at the particular angular position with respect to the β axis.

In some implementations, blocks 615 and 620 of FIG. 6 may be repeated such that a distal appendage may be rotated in either direction about the β axis and fixed any particular angles with respect to the β axis.

Implementations of the subject matter described in this specification may be implemented as one or more computer programs, i.e., one or more modules of computer program instructions, encoded on non-transitory computer readable medium for execution by, or to control the operation of, a data processing apparatus, such as, for example, controller 504.

Referring again to FIGS. 1A-C and 2A-D, it will be appreciated that the hinges disclosed herein, advantageously, allows for independent post deployment rotation of an appendage of a spacecraft about the β axis. As a result, distal appendage 112 and consequently solar array 108 of FIGS. 1A-C, unlike conventional solar arrays, have been shown to be independently rotatable about the β axis when spacecraft 100 is in the on-orbit configuration.

Thus, an improved hinge has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
  a body;
  a solar array; and
  an arrangement mechanically coupling the solar array with a sidewall of the body, the arrangement including:
    a proximal appendage having a proximal end connected with the body, the proximal appendage configured to be reconfigurable from a launch configuration to an on-orbit configuration, wherein, in the on-orbit configuration, a long axis of the proximal appendage defines an α axis that is substantially orthogonal to the sidewall;
    a distal appendage rotatably coupled with the proximal appendage by way of a hinge connecting a distal end of the proximal appendage with a proximal end of the distal appendage, the hinge being configured such that the distal appendage is rotatable with respect to the proximal appendage about a β axis that is not aligned with the α axis; and
    a closed cable loop (CCL) system coupled with the proximal appendage and the distal appendage and configured to synchronize deployment of at least a portion of the solar array wherein:
    the hinge includes a rotation driving mechanism configured to cause the distal appendage to rotate about the β axis when the proximal appendage is in the on-orbit configuration and a CCL disengagement mechanism configured to de-couple the CCL system from the proximal appendage and the distal appendage.

2. The spacecraft of claim 1, the arrangement further including a restraint mechanism; wherein:
  the rotation driving mechanism is configured to cause the distal appendage to rotate about the β axis in a first direction to a first orientation and the restraint mechanism is configured to cause the distal appendage to be fixed in the first orientation, and
  the rotation driving mechanism is configured to cause the distal appendage to rotate about the β axis in a second direction from the first orientation to a second orientation and the restraint mechanism is configured to cause the distal appendage to be fixed in the second orientation.

3. The spacecraft of claim 2, wherein:
  the rotation driving mechanism includes a drive assembly coupled with the proximal appendage, the drive assembly including a motor having a central shaft connected with the proximal end of the distal appendage by way of a plurality of rods positioned radially outwardly from the central shaft; and
  the restraint mechanism includes interlocking interfaces connected with each of the rods, each of the interlocking interfaces configured to interlock with a corresponding interlocking surface of the drive assembly.

4. The spacecraft of claim 3, wherein the interlocking interfaces include: one or more of a friction pad interface, a pin type interlock interface, and a mechanical interlock interface.

5. The spacecraft of claim 2, the spacecraft further comprising a cam coupled with the distal appendage, the cam having a plurality of slots, each slot corresponding to one of a plurality of positions; wherein:
  the restraint mechanism includes a latch roller connected with the proximal appendage, the latch roller configured to rest in the slots, and
  the rotation driving mechanism includes a motor connected with a fork configured to drive the latch roller from a first one of the slots to a second one of the slots.

6. The spacecraft of claim 5, wherein the slots have a semi-obround cross-section and the latch roller has a semicircular cross-section.

7. The spacecraft of claim 1, wherein the CCL disengagement mechanism includes:
  a pulley connected with the distal appendage and the proximal appendage and a restraining member coupled with the distal end of the proximal appendage, wherein:

the pulley is configured to transmit torque from the CCL system to the proximal appendage and the distal appendage when the pulley is in a compressed position;

the pulley is configured to not transmit torque from the CCL system to the proximal appendage and the distal appendage when the pulley is in an expanded position; and the restraining member is configured to press a tab coupled with the pulley such that the pulley is in the compressed position when the restraining member presses the tab and the pulley is in the expanded position when the restraining member does not press the tab, the tab being configured such that the restraining member presses the tab only during deployment of the distal appendage.

8. A system comprising:

an arrangement mechanically coupling a solar array with a sidewall of a body of a spacecraft, the arrangement including:

a proximal appendage having a proximal end connected with the body, the proximal appendage configured to be reconfigurable from a launch configuration to an on-orbit configuration, wherein, in the on-orbit configuration, a long axis of the proximal appendage defines an α axis that is substantially orthogonal to the sidewall;

a distal appendage rotatably coupled with the proximal appendage by way of a hinge connecting a distal end of the proximal appendage with a proximal end of the distal appendage, the hinge being configured such that the distal appendage is rotatable with respect to the proximal appendage about a β axis that is not aligned with the α axis; and a closed cable loop (CCL) system coupled with the proximal appendage and the distal appendage and configured to synchronize deployment of at least a portion of the solar array wherein:

the hinge includes a rotation driving mechanism configured to cause the distal appendage to rotate about the β axis when the proximal appendage is in the on-orbit configuration and a CCL disengagement mechanism configured to de-couple the CCL system from the proximal appendage and the distal appendage, and the hinge includes a restraint mechanism; and a controller configured to provide control signals to cause:

rotating, using the rotation driving mechanism, the distal appendage about the β axis.

9. The system of claim 8, the controller further configured to provide control signals to cause:

rotating, using the rotation driving mechanism, the distal appendage about the β axis in a first direction to a first orientation;

fixing, using the restraint mechanism, the distal appendage in the first orientation;

rotating, using the rotation driving mechanism, the distal appendage about the β axis in a second direction from the first orientation to a second orientation; and fixing, using the restraint mechanism, the distal appendage in the second orientation.

10. The system of claim 8, wherein:

the rotation driving mechanism includes a drive assembly coupled with the proximal appendage, the drive assembly including a motor having a central shaft connected with the proximal end of the distal appendage by way of a plurality of rods positioned radially outwardly from the central shaft; and the restraint mechanism includes interlocking interfaces connected with each of the rods, each of the interlocking interfaces configured to interlock with a corresponding interlocking surface of the drive assembly.

11. The system of claim 10, wherein the interlocking interfaces include: one or more of a friction pad interface, a pin type interlock interface, and a mechanical interlock interface.

12. The system of claim 8, the spacecraft further comprising a cam coupled with the distal appendage, the cam having a plurality of slots, each slot corresponding to one of a plurality of positions, wherein:

the restraint mechanism includes a latch roller connected with the proximal appendage, the latch roller configured to rest in the slots, and the rotation driving mechanism includes a motor connected with a fork configured to drive the latch roller from a first one of the slots to a second one of the slots.

13. The system of claim 12, wherein the slots have a semi-obround cross-section and the latch roller has a semi-circular cross-section.

14. The system of claim 8, wherein the CCL disengagement mechanism includes:

a pulley connected with the distal appendage and the proximal appendage and a restraining member coupled with the distal end of the proximal appendage, wherein:

the pulley is configured to transmit torque from the CCL system to the proximal appendage and the distal appendage when the pulley is in a compressed position;

the pulley is configured to not transmit torque from the CCL system to the proximal appendage and the distal appendage when the pulley is in an expanded position; and the restraining member is configured to press a tab coupled with the pulley such that the pulley is in the compressed position when the restraining member presses the tab and the pulley is in the expanded position when the restraining member does not press the tab, the tab being configured such that the restraining member presses the tab only during deployment of the distal appendage.

15. A method comprising:

causing an arrangement mechanically coupling a solar array with a sidewall of a body of a spacecraft to transition from a launch configuration to an on-orbit configuration wherein, the arrangement includes:

a proximal appendage having a proximal end connected with the body, the proximal appendage configured to be reconfigurable from a launch configuration to an on-orbit configuration, wherein, in the on-orbit configuration, a long axis of the proximal appendage defines an α axis that is substantially orthogonal to the sidewall;

a distal appendage rotatably coupled with the proximal appendage by way of a hinge connecting a distal end of the proximal appendage with a proximal end of the distal appendage, the hinge being configured such that the distal appendage is rotatable with respect to the proximal appendage about a β axis that is not aligned with the α axis; and a closed cable loop (CCL) system coupled with the proximal appendage and the distal appendage and configured to synchronize deployment of at least a portion of the solar array wherein:
the hinge includes a rotation driving mechanism configured to cause the distal appendage to rotate about the β axis when the proximal appendage is in the on-orbit configuration and a CCL disengagement mechanism configured to de-couple the CCL system from the proximal appendage and the distal appendage;
decoupling, using the CCL disengagement mechanism, the CCL system from the CCL system from the proximal appendage and the distal appendage; and
rotating, using the rotation driving mechanism, the distal appendage about the β axis.

16. The method of claim 15, further comprising:
rotating, using the rotation driving mechanism, the distal appendage about the β axis in a first direction to a first orientation;
fixing the distal appendage in the first orientation;
rotating, using the rotation driving mechanism, the distal appendage about the β axis in a second direction from the first orientation to a second orientation; and
fixing the distal appendage in the second orientation.

17. The method of claim 16, wherein:
rotating, the distal appendage to about the β axis includes activating a drive assembly coupled with the proximal appendage, the drive assembly including a motor having a central shaft connected with the proximal end of the distal appendage by way of a plurality of rods positioned radially outwardly from the central shaft; and
fixing the distal appendage includes causing interlocking interfaces connected with each of the rods to interlock with a corresponding interlocking surface of the drive assembly.

18. The method of claim 17, wherein the interlocking interfaces include: one or more of a friction pad interface, a pin type interlock interface, and a mechanical interlock interface.

19. The method of claim 15, wherein:
rotating the distal appendage to about the β axis includes activating a motor connected with a fork to drive a latch roller from a first one of a plurality of slots on a surface of a cam coupled with the distal appendage to second one of the slots; and
fixing the distal appendage includes causing the latch roller to rest in the slots.

20. The method of claim 15, wherein the CCL disengagement mechanism includes:
a pulley connected with the distal appendage and the proximal appendage and a restraining member coupled with the distal end of the proximal appendage, wherein:
the pulley is configured to transmit torque from the CCL system to the proximal appendage and the distal appendage when the pulley is in a compressed position;
the pulley is configured to not transmit torque from the CCL system to the proximal appendage and the distal appendage when the pulley is in an expanded position; and
the restraining member is configured to press a tab coupled with the pulley such that the pulley is in the compressed position when the restraining member presses the tab and the pulley is in the expanded position when the restraining member does not press the tab, the tab being configured such that the restraining member presses the tab only during deployment of the distal appendage.

* * * * *